UNITED STATES PATENT OFFICE.

ALBERT HENRI JACQUES BERGÉ, OF BRUSSELS, BELGIUM.

ACID SACCHARIFICATION OF AMYLACEOUS SUBSTANCES.

SPECIFICATION forming part of Letters Patent No. 432,358, dated July 15, 1890.

Application filed July 21, 1888. Serial No. 280,774. (No specimens.) Patented in Austria-Hungary February 9, 1887, No. 7,786, and in Belgium December 30, 1887, No. 80,125.

*To all whom it may concern:*

Be it known that I, ALBERT HENRI JACQUES BERGÉ, engineer, of Brussels, in the Kingdom of Belgium, have invented a new and useful Process for the Saccharification of Starch or of Primary Amylaceous Substances by the Employment of Sulphurous Acid under High Pressure for the Preparation of Sirups of Glucose or of Wort for Breweries or Distilleries, (for which no patent has been obtained in any country except in Belgium December 30, 1887, No. 80,125, and in Austria-Hungary February 9, 1887, number of certificate 7,786,) of which the following is a specification.

It is generally supposed that the saccharification of starch is more rapidly accomplished and rendered more complete when the acid used for the purpose is stronger, the temperature higher, and the duration of the operation longer. There are, however, great difficulties to be met with in order to satisfy these conditions. Too great a quantity of acid is injurious, as it impairs the quality of the products to be prepared, too high a temperature carbonizes the products, and too long a duration of the process is also for several reasons a disadvantage. The fact that pressure plays an important part in chemical reactions led me to utilize it also in saccharifying starch. A series of experiments with various acids has shown that the saccharification becomes more rapid and more complete in proportion as the pressure is increased. For instance, in two trials, in which the quantity of acid, temperature, and duration of the process were the same, but of which one took place in a closed vessel under the pressure of steam corresponding to the said temperature, while the other was effected under a much greater pressure produced by the compression of air or other gases in the vessel, the second trial resulted in a far more complete saccharification. The consequence of this is that the saccharifying power of all acids is promoted by compression or by forcing air or other gases into the vessels in which the operation is effected, and that in consequence a smaller quantity of acid may be used, while the usual conditions of temperature remain the same.

The application of this general principle in connection with the application of sulphurous acid to the saccharification of starch has justified in a complete manner these propositions. In this particular case the principle is of great importance, for it is here a question of treatment with the least-concentrated solutions. It is in fact generally known that it is very difficult to prepare rich solutions of sulphurous acid, whereas acid solutions containing from one to three per cent. can easily be prepared by means of a simple column. By forcing into the vessel wherein the operation is effected carbonic-acid gas, nitrogen, or any other non-oxidizing gas, so as to obtain a great pressure, the products are transformed completely into sugar by means of a slightly-concentrated solution of sulphuric acid. As in this process the action of the oxygen is to be avoided, the latter is excluded from the vessel wherein the reaction takes place.

Although the process may be effected in various manners, I shall describe only the following, as it gives the best results in practice. When the product to be saccharified has been placed in a boiler along with the solution of sulphurous acid, carbonic-acid gas is introduced into this boiler, and this gas, having a greater density than air, expels the latter from the boiler. As soon as a lighted candle placed near the opening of the boiler is extinguished the latter is closed and carbonic-acid gas compressed into it until the required pressure is reached. Of course any other gas—such as sulphurous acid or a mixture of non-oxidizing gases which are heavier than air—can fulfill the same purpose. When concentrated solutions of sulphurous acid are used, so that the great pressure required is produced by the reagent itself, it is of the greatest importance to remove entirely the air, which would otherwise be injurious to the process, owing to its oxidizing action. Particular stress must be laid on this point in practice, as sulphurous acid is at temperatures above 100° easily transformed into sulphuric acid, so that when the greatest care has not been exercised it may be supposed that the transformation into sugar was due to the sulphuric acid formed. In following the process as first described no sulphuric acid whatever will be formed. The production of sulphuric acid presents the disadvantage that the latter must afterward be neutralized either with carbonate of lime or baryta; but this always spoils the taste and alters the purity of the product obtained. Beside this, this mixture corrodes the copper, and when vessels provided internally with a lining of lead are used a small quantity of sulphate of lead is always produced.

When the operation is over, the sulphurous acid is collected for the purpose of utilizing it in a subsequent operation. The saccharified product is freed from the particles of sulphurous acid adhering to it by means of a steam-jet. When this acid has been regenerated, it can be used indefinitely. The sulphites act in the same manner as the sulphurous acid, and they require, when used for saccharifying purposes, the same precautions as the latter acid. The application of sulphurous acid and sulphites under the aforesaid conditions is highly preferable to that of other acids, as the latter exercise a special action on the volatile oils, which are contained in various substances, especially in potato-starch. The action of potato-starch is such that the grape-sugar resulting therefrom gives through fermentation an excellent alcohol. The pressure to be produced is in proportion to the quantity of acid used, the temperature, the duration of the process, and the nature of the substance to be transformed to sugar. Generally speaking, an initial pressure of six or seven atmospheres gives good results. I have besides effected the transformation of amylaceous substances into sugar by means of carbonic-acid gas compressed at a high pressure. The best results are obtained by treating dry or at least nearly dry substances, or, better, by treating substances which have been previously heated to a temperature of 100° for the purpose of removing the superfluous water and keeping the substances hydrated to a certain extent only. Under these circumstances no starch-paste is formed during the process. This substance placed in a closed vessel is then submitted to the pressure of compound carbonic-acid gas or a mixture of other gases, said pressure varying in proportion to the degree of saccharizing to be produced, while the substance is brought to a temperature corresponding to this degree, but such temperature always exceeding 100°. The same results can also be obtained by treating solutions of amylaceous substances or dextrine solutions which are heated under gas-pressure in a closed vessel.

In short, the object of the invention is the transformation into dextrine and glucose of all starchy substances, whether they are in the natural state or freed from foreign substances—such as potato-flour, rice-starch, wheat-starch, or maize-starch, &c.—which may previously be transformed into dextrine or similar products. The process can generally be employed for the preparation of saccharine ingredients—saccharine—and its application extended to the numerous operations used in breweries, and the preparation of alcohol for the purpose of transforming starchy substances into sugar.

Having thus fully described my said invention and in what manner the same has to be performed, what I claim is—

1. The process of saccharifying amylaceous substances, which consists in placing such substance in a vessel with sulphurous acid, completely expelling the air from said vessel, closing said vessel, and forcing thereinto a non-oxidizing gas under pressure, substantially as set forth.

2. The process of saccharifying amylaceous substances, which consists in placing such substance in a vessel with sulphurous acid, filling said vessel with a non-oxidizing gas heavier than air, thereby completely expelling the air from said vessel, closing the outlet to said vessel, and continuing the inflow of said gas under pressure, substantially as set forth.

3. The process of saccharifying amylaceous substances, which consists in introducing such substance into a closed vessel with sulphurous acid, forcing carbonic-acid gas under pressure into said vessel so as to entirely expel the air therefrom, heating said vessel, and subsequently withdrawing the treated substance and subjecting it to a steam-jet, substantially as set forth.

ALBERT HENRI JACQUES BERGÉ.

Witnesses:
AUG. JOERISSEN,
T. S. HEINE.